United States Patent [19]

Tung

[11] 3,885,246
[45] May 27, 1975

[54] RETROREFLECTIVE PROTECTIVE HELMET
[75] Inventor: Chi Fang Tung, Mahtomedi, Minn.
[73] Assignee: Minnesota Mining and Manufacturing Company, St. Paul, Minn.
[22] Filed: Nov. 5, 1973
[21] Appl. No.: 412,920

[52] U.S. Cl. .................................. 2/3 R; 350/105
[51] Int. Cl. ......................... A42b 3/02; G02b 5/12
[58] Field of Search ............ 2/3 R, 185 R, 187, 175, 2/171; 350/97, 98, 105; 117/33, 35 R, 27

[56] References Cited
UNITED STATES PATENTS

| | | |
|---|---|---|
| 2,948,191 | 8/1960 | Hodgson, Jr. et al. ............ 350/105 |
| 3,190,178 | 6/1965 | McKenzie ............................ 350/105 |
| 3,242,500 | 3/1966 | Derr ...................................... 2/3 R |
| 3,245,087 | 4/1966 | Marchello ............................. 2/3 R |
| 3,310,900 | 3/1967 | Hamilton et al. ............. 350/105 UX |
| 3,420,597 | 1/1969 | Nellessen et al. .................. 117/27 X |
| 3,573,954 | 4/1971 | Yamamoto ......................... 350/105 |
| 3,770,483 | 11/1973 | Komine ................................. 2/3 R |
| 3,795,435 | 3/1974 | Schwab ............................... 350/105 |

Primary Examiner—Werner H. Schroeder
Attorney, Agent, or Firm—Alexander, Sell, Steldt & Delahunt

[57] ABSTRACT

Protective helmets that give a distinctive retrorefelctive signal under wet or dry conditions at night or in other darkened environments are provided by disposing a retroreflective layer covered by a transparent layer over at least a major portion of the outer surface of the helmet.

2 Claims, 5 Drawing Figures

RETROREFLECTIVE PROTECTIVE HELMET

The present invention is based on the conception that protective helmets such as worn by motorcyclists, construction workers, or miners could be a useful tool to provide distinctive retroreflective signals at night or in other darkened environments. Others have previously suggested adding retroreflective elements to protective helmets, as shown by U.S. Pat. No. 3,577,561, but the retroreflective treatments of these prior suggestions were of limited value: they did not use the retroreflective signal to provide a distinctive indication of the presence of a person wearing a helmet; they did not provide a retroreflective signal of maximum conspicuity; and they required cumbersome unattractive attachments to a helmet that were vulnerable to accidental removal.

The present invention provides smooth-surfaced attractive retroreflective protective helmets that provide a distinctive retroreflective signal of excellent brightness and angularity and that function whether wet or dry. Briefly, a protective helmet of the invention generally comprises a protective shell adapted to be worn on a person's head, and a retroreflective layer that is attached to the shell, is visible from the exterior of the shell, and extends over at least a major portion (that is, at least half) of the surface of the shell. The retroreflective layer comprises a layer of binder material and a monolayer of transparent glass microspheres that are partially embedded in the layer of binder material and have specular reflective means underlying their embedded surfaces. A transparent layer that forms the outer surface of the helmet is disposed directly over the microspheres to protect them from contact by moisture, whereby the retroreflective layer retroreflects light shined at the helmet under either wet or dry conditions.

DETAILED DESCRIPTION

Figure 1:
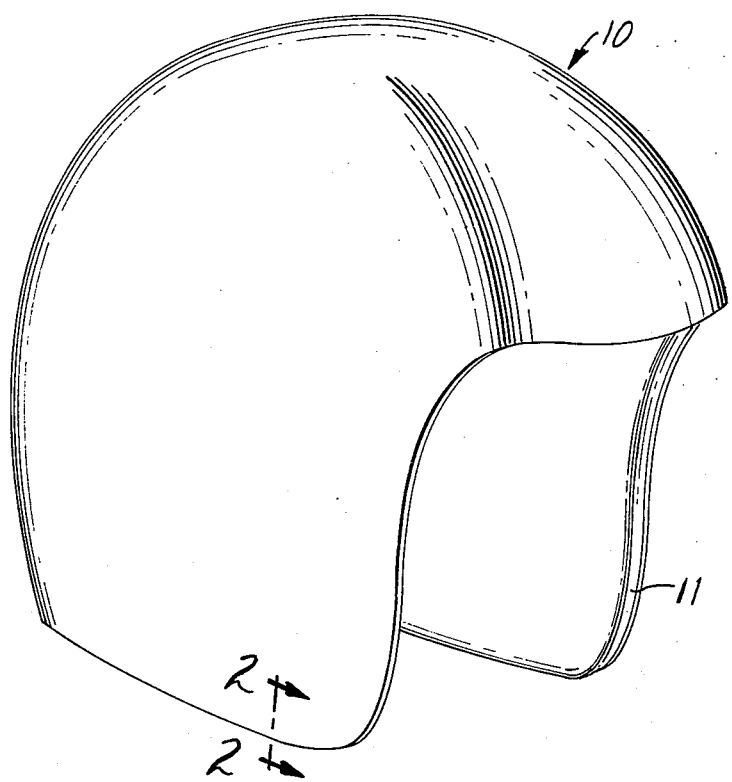
FIG. 1 is a perspective view of a protective helmet of the invention.
Figure 2:
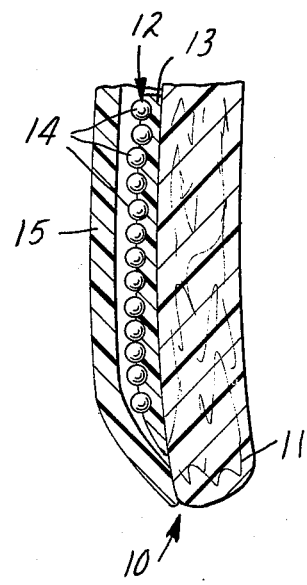
FIG. 2 is a section through a peripheral portion of the protective helmet shown in FIG. 1 taken along the lines 2—2 of FIG. 1.

The illustrative protective helmet of the invention 10 shown in FIGS. 1 and 2 comprises a protective shell 11 adapted to be worn on a person's head (usually harness means attached to the inside of the shell, not shown, engage the person's head); a retroreflective layer 12 covering the outer surface of the rigid shell, the layer 12 comprising a layer 13 of binder material and a monolayer of transparent glass microspheres 14 that are partially embedded in the layer of binder material and have specular reflective means underlying their embedded surfaces (not shown in the drawings); and a transparent sheet or layer 15 that has the shape of the protective shell disposed directly over the retroreflective layer.

The transparent sheet 15 is attached to the protective shell 11 near the periphery of the shell, as by a layer of adhesive, a heat-seal, or mechanical fasteners, and that attachment provides an air-tight sealed pocket between the retroreflective layer and the transparent sheet. However, over at least most of the retroreflective layer, the transparent sheet 15 is spaced from the exposed surfaces of the microspheres 14. The spacing of the transparent sheet from the microspheres may be quite small, just sufficient to prevent the sheeting and microspheres from making optical contact, which would cause the contacted portion of the microspheres not to refract light to the degree necessary to cause the desired retroreflection.

Figure 3:
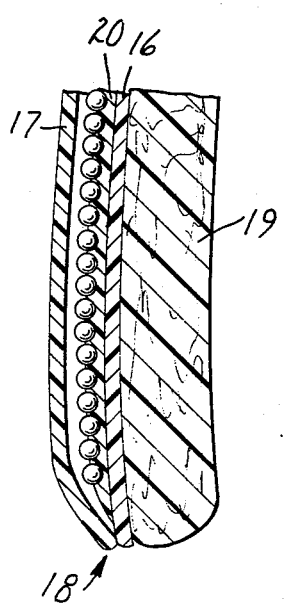
FIG. 3 is section through a peripheral portion of a component of a protective helmet of the invention.

As shown in FIG. 3, in some embodiments of the invention the retroreflective layer is carried on a support sheet 16 that has the shape of the protective shell, and the support sheet 18 and a transparent sheet 17 to which the support sheet is attached at the periphery of the two sheets form a unified article 18 that is removable from the shell 19. The unified article 18 is like a sleeve that resiliently and tightly slides onto the shell 19, where it is held in place either by its own resiliency or by clamps or other fastening devices. In some embodiments, the layer 20 of binder material for the retroreflective layer itself constitutes the support sheet of a unified, sleeve-type article.

Figure 4:
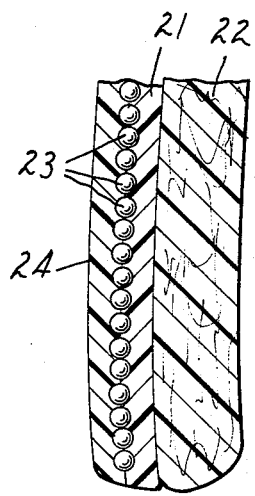
FIGS. 4 and 5 are sections through peripheral portions of different helmets of the invention.

In FIG. 4 a layer of binder material 21 is coated onto a shell 22, a monolayer of transparent glass microspheres 23 is partially embedded in the layer of binder material, and a transparent layer 24 is disposed directly over the outer surfaces of the microspheres. The transparent layer 24 engages and makes optical contact with the surfaces of the microspheres 23 and for that reason must be of a special index of refraction to permit the microspheres to retroreflect. Generally, the index of refraction of the transparent layer 24 and glass microspheres 23 should be in a ratio of 1.92 to 1.94, so that, if the index of refraction of the transparent layer 24 is 1.38 (as with certain fluorinated polymers) the index of refraction of the transparent microspheres 23 should be 2.65 to 2.67.

A preferred shell for use in a protective helmet of the invention, as shown in FIGS. 1–4, is a hard rigid material such as a synthetic polymeric material containing a fibrous reinforcement such as woven glass cloth. The polymeric material is typically based on a polyester or epoxy resin.

Figure 5:
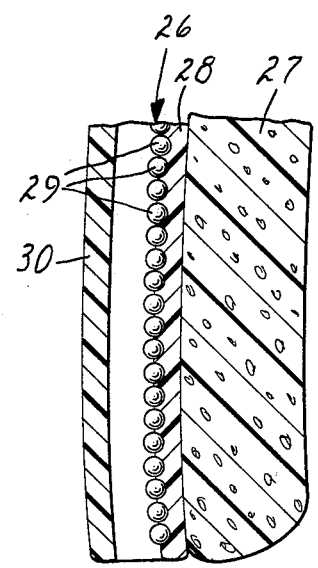

Another protective shell used in the invention, as shown in FIG. 5, is of a thicker construction and comprises a cellular material such as compressed adhered particles of polystyrene foam. A retroreflective layer 26 on the shell 27 comprises a layer 28 of binder material directly coated onto the shell, and a monolayer of transparent glass microspheres 29 that are partially embedded in the layer of binder material and have specular means underlying their embedded surfaces. A transparent layer 30, in the form of a hard rigid removable shell of a material such as polycarbonate, is slidingly received over the shell and protects the glass microspheres from contact with moisture. The transparent shell 30 generally is sufficiently resilient so that it can be force-fit over the protective shell and held in place as a result of the tight fit. Although the outer transparent shell may contact the microspheres at some points over the whole surface of the helmet, at at least most locations it will be spaced sufficiently from the microspheres to avoid optical contact and to accordingly permit retroreflection by the microspheres.

The retroreflective layer on a protective helmet of the invention may be conveniently formed by methods taught in Nellessen et al., U.S. Pat. No. 3,420,597, which is incorporated herein by reference. The retroreflective layer is typically formed from a coating composition that comprises a liquid vehicle including a film-forming binder material and volatile thinner, and transparent glass microspheres that are dispersed in the liquid vehicle and are covered over their whole surface with specular reflective material such as vapor-deposited aluminum or chemically deposited silver. When the coating composition is coated onto a protective shell, the microspheres tend to settle within the coating until they rest at or near the bottom of the layer of liquid vehicle and engage the surface of the shell. The liquid vehicle is generally diluted so that the vehicle will readily flow off the outer surface of the microspheres and leave at most a thin coating of binder material on the microspheres. After the coating has dried, an etching solution is applied, and it removes both the thin layer, if any, of binder material on the outer surfaces of the glass microspheres as well as the aluminum or other coating of specular reflective material on the outer surfaces of the microspheres. The result is a layer of dried or cured binder material and a monolayer of transparent glass microspheres partially embedded in the layer of binder material, with a cap of specular reflective material on the embedded surfaces of the microspheres.

A wide variety of binder materials may be used in retroreflective layers on protective helmets of the invention, including acrylic and alkyd resins, and elastomeric epoxypolyamine compositions such as described in U.S. Pat. No. 3,436,359. For embodiments such as shown in FIG. 3, the support sheet is preferably a flexible material such as polyvinyl chloride. Support sheets of the desired shape can be formed by vacuum molding or casting procedures, for example. Typical materials for the transparent layer disposed over the retroreflective layer are polyvinyl chloride, polystyrene, and for the embodiment shown in FIG. 5, polycarbonates. The transparent layer may be flexible as in the case of the embodiment shown in FIG. 3, or rigid as in the embodiment shown in FIG. 5. Generally the transparent sheet will be between 0.005 and 0.25 inch thick.

Generally the transparent glass microspheres used in this invention average about 50 microns in diameter, though their average diameter may range between about 20 to 100 microns in diameter. They are generally included in the coating composition in an amount sufficient to provide between about 20 and 90 weight-percent of the total non-volatile material in the coating composition.

The invention will be illustrated by the following examples.

EXAMPLE 1

A hard rigid smooth-surfaced protective shell of a synthetic polymeric material reinforced with layers of woven cloth was coated with a composition having the following formulation.

| | Parts by Weight |
|---|---|
| Water-soluble thermosetting acrylic resin including 40 weight-percent of a solvent mixture of butoxyethanol, butyl cellosolve, and water (Synthemul 40–552 made by Reichold) | 12 |
| Hexamethoxymethylmelamine liquid catalyst (Cymil 301 made by American Cyanamide) | 3 |
| Propyleneglycol thinner | 15 |
| Transparent glass microspheres having an average diameter of 50 microns and coated with silver. | 70 |

The coating was allowed to dry at 250°F for 30 minutes, after which an etching solution that comprised 124 grams of potassium dichromate, 240 milliliters of 36N sulfuric acid and 15,000 milliliters of water was applied over the coating. Thereupon the outer surfaces of the microspheres were exposed, so that the microspheres were embedded to slightly over 50 percent of their diameter.

Thereupon a transparent sheet was formed by heating a 15 mil-thick-sheet of vinyl chloride until the sheet began to sag, and then drawing the sheet by vacuum over a helmet-shaped mold. This transparent sheet was then placed over the coated helmet, and adhered to the shell by a strip of adhesive applied around the periphery of the shell.

EXAMPLE 2

A structure as shown in FIG. 5 was prepared by coating a shell of compressed polystyrene cellular particles with an acrylic latex, drying the coating to form a smooth base, and then forming a retroreflective layer over the dry coating in the manner described in Example 1. A transparent polycarbonate shell was then forced over the polystyrene shell to achieve a friction fit.

What is claimed is:

1. A protective helmet comprising a protective shell adapted to be worn on a person's head; a retroreflective layer disposed over substantially all of the outer surface of the protective shell, comprising a layer of binder material and a monolayer of transparent glass microspheres that are partially embedded in the layer of binder material and have a coating of specular reflective material on their embedded surfaces; and a transparent sheet having the shape of the protective shell disposed directly over the retroreflective layer, said sheet being in tight frictional engagement with said retroreflective layer but without optical contact to the exposed surfaces of the microspheres and being attached to the protective shell at least around the periphery of the retroreflective layer so as to provide an airtight sealed pocket between the retroreflective layer and the transparent sheet, whereby the retroreflective layer retroreflects light shined at the helmet under either wet or dry conditions.

2. A protective helmet of claim 1 in which the retroreflective layer is carried on a support sheet that has the shape of the protective shell and is attached over the exterior of the protective shell.

* * * * *